United States Patent

[11] 3,588,727

[72] Inventor Harold Seidel
Warren Township, Somerset County, N.J.

[21] Appl. No. 783,512
[22] Filed Dec. 13, 1968
[45] Patented June 28, 1971
[73] Assignee Bell Telephone Laboratories, Incorporated
Murray Hill, Berkeley Heights, N.J.

[54] IMAGED IMPEDANCE THROUGH FREQUENCY CONVERSION
9 Claims, 9 Drawing Figs.

[52] U.S. Cl. 330/34, 307/88.3, 321/43, 325/430, 325/432, 325/446, 330/4.9, 330/56, 333/28, 333/73, 333/83
[51] Int. Cl. H03f 3/12
[50] Field of Search 307/88.3; 321/43; 333/28, 73, 83, (Inquired); 330/34, 61, 4.5; 325/432, (Inquired)

[56] References Cited

UNITED STATES PATENTS

| | | | |
|---|---|---|---|
| 3,051,909 | 8/1962 | Engelbrecht | 307/88.3 |
| 3,189,750 | 6/1965 | Dain et al. | 307/88.3 |
| 3,189,828 | 6/1965 | Chang | 307/88.3 |
| 3,244,992 | 4/1966 | Leon | 307/88.3 |
| 3,283,167 | 11/1966 | Schaug-Petersen et al. | 307/88.3 |
| 3,293,447 | 12/1966 | Fleming | 307/88.3 |
| 3,320,432 | 5/1967 | La Rosa | 307/88.3 |
| 3,346 740 | 10/1967 | Brobst et al. | 307/88.3 |
| 3,353,031 | 11/1967 | Abel | 307/88.3 |
| 3,447,102 | 5/1969 | Gewartowski | 307/88.3 |
| 3,462,612 | 8/1969 | Seidel | 307/88.3 |
| 2.695,332 | 11/1954 | Caruthers | 179/15 |
| 3,019,296 | 1/1962 | Schelleng | 325/11 |
| 3,213,452 | 10/1965 | Carpentier et al. | 333/70 |
| 3,237,017 | 2/1966 | Maurer et al. | 330/4.5 |

OTHER REFERENCES

Chang, " Proc. I.R.E.", Jan. 1959, pp. 81— 82. 330/4.5

*Primary Examiner*—Roy Lake
*Assistant Examiner*—Darwin R. Hostetter
*Attorneys*—R. J. Guenther and Arthur J. Torsiglieri

ABSTRACT: This application describes the manner in which a frequency converter can be used as a bridge between different frequency domains. In particular, a frequency converter is used to image low frequency circuit components at a higher frequency, thereby producing circuit responses at the higher frequency that could not ordinarily be produced directly. For example, a relatively moderate Q resonant circuit is imaged at a higher frequency with a Q that is increased by the frequency transformation ratio. A negative resistance diode is imaged at a higher frequency thereby producing amplification at a frequency at which such a diode could not normally operate.

INVENTOR
H. SEIDEL
BY
Sylvan Sherman
ATTORNEY

IMAGED IMPEDANCE THROUGH FREQUENCY CONVERSION

This invention relates to the use of frequency converters as a means of bridging different frequency domains to provide circuit elements at a higher frequency in a form in which such elements are not normally available

BACKGROUND OF THE INVENTION

It is well known in the art to translate a high frequency signal to a lower frequency. This is done for a variety of reasons. In the typical broadcast receiver this is done in order to employ a fixed amplifier at the so-called "intermediate frequency" to amplify all incoming signals, irrespective of their particular frequency. The technique of translating to a lower frequency to perform circuit functions more conveniently performed at the lower frequency is also applied at repeater stations in long distance transmission systems.

In both these applications, and other typical applications that might come to mind, the down-converter or mixer is used to perform the specific function of frequency conversion. The frequency transition, once it is made, is completed in the sense that the translated signal now partakes of other circuit functions such as amplification, et cetera. In all such cases, however, there is no further interaction between the mixer and the down-converted signal.

SUMMARY OF THE INVENTION

In accordance with one aspect of the present invention, a frequency converter is used in a reflective mode as a means of imaging selective circuit components in filters and equalizer networks. The purpose in so doing is to make available at high frequencies circuit components that would ordinarily be available only at lower frequencies. It will be noted that when used in this manner, the converter does not provide a separate circuit function, in the sense described above where the converter is one of a series of circuit functions. Instead, the converter serves as part of a single element in a larger circuit function. More specifically, it serves as a means of bridging two frequency domains to provide a circuit element at the higher frequency in a form in which it is not normally available at that higher frequency.

For example, at millimeter wave frequencies, high-Q resonant circuits take the form of large volume cavities. Lumped elements or printed circuit techniques typically can not be used for this purpose. Thus, in accordance with one embodiment of the present invention, lumped elements forming a relatively low-Q resonant circuit at a low frequency, are imaged by a frequency converter as a high-Q resonant circuit at a higher frequency. In this manner, lumped elements can be employed to fabricate equalizers and narrow band filters for use in high frequency circuits.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
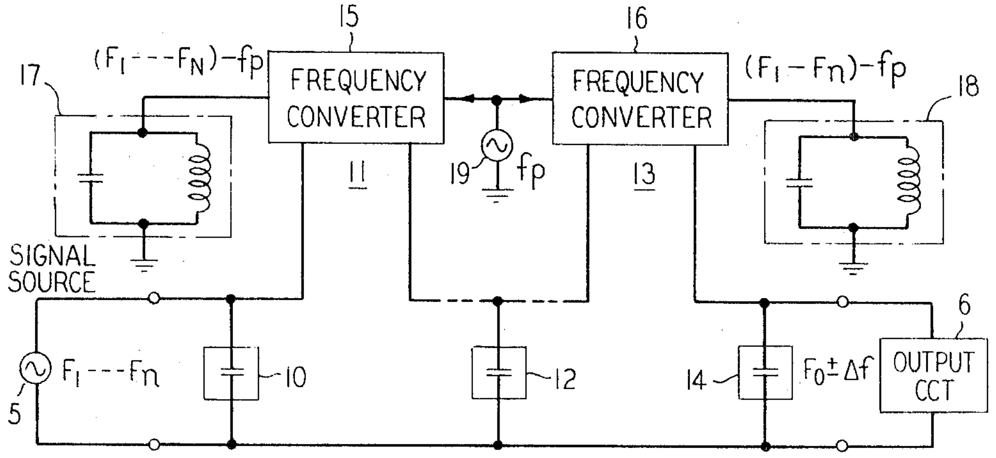
FIG. 1 shows, in block diagram, a filter in accordance with the present invention.

Referring to the drawings, FIG. 1 shows, in block diagram, a filter system operative over a frequency band $F_1$ to $F_n$ comprising a plurality of shunt-connected circuit components 10, 12 and 14 separated by series-connected circuit components 11 and 13, where each of the former is a converting means 15 and 16 for imaging the parallel L–C circuits 17 and 18 between different frequency domains. A signal source 5 for energizing said system over said band is connected at one end of the filter. An output circuit for utilizing the signals within at least a portion of said band $F_o \pm \Delta f$ is coupled to the output end of the filter. With the filter operating over the frequency band between $F_1$ and $F_n$, and local oscillator 19 operating at a frequency $f_p$ slightly higher or lower (preferably lower) than band $F_1$ to $F_n$, circuits 17 and 18 operate over a much lower frequency band given by the difference frequencies $(f_1 - f_p)$ to $(F_n - f_p)$.

The present invention makes use of the fact that a frequency converter transforms a resonant circuit between frequency domains in a manner which preserves the circuit bandwidth. Thus, in FIG. 1, each of the parallel resonant circuits 17 and 18 has a bandwidth $W = 2\Delta f$ at resonant frequency $f_o$ given by $$W = f_o/Q_o, \qquad (1)$$

and the same bandwidth W at the higher frequency $f_i$ given by $$W = F_i/Q_i, \qquad (2)$$

where $f_o$ is a frequency between $(F_n - f_p)$ and $(F_1 - f_p)$;

$F_i$ is a frequency between $F_1$ and $F_n$ equal to $f_p + f_o$;

$Q_o$ is the circuit Q at frequency $f_o$;

and $Q_i$ is the circuit Q imaged at frequency $F_i$.

Equating equations (1) and 2) gives $$f_o/Q_o = F_i/Q_i \qquad (3)$$

or $$Q_i = Q_o(F_i/f_o). \qquad (4)$$

Thus, as seen from equation (4), the effect produced by converters 15 and 16 is to increase the effective Q of circuits 17 and 18 by the frequency conversion factor $F_i/f_o$. This makes it possible to realize very narrow band (high-Q) circuits at frequencies for which such circuits are not normally available. For example, a typical filter circuit at microwave frequencies comprises a resonant cavity whose Q is directly a function of the cavity volume-to-surface ratio. Thus, typically, a narrow band response requires a relatively large volume cavity. In accordance with the present invention, however, arbitrarily narrow bandwidths can be realized using a relatively small cavity or by using lumped circuit components.

Figure 2:
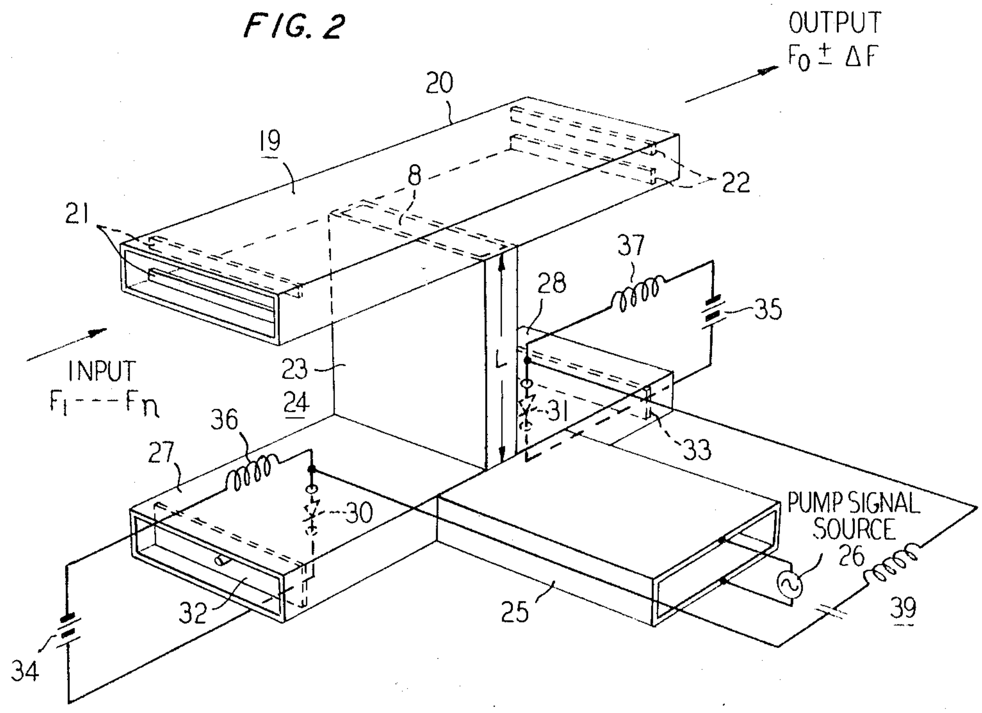
FIG. 2 shows a first illustrative embodiment of the invention using conductively bounded waveguides.

FIG. 2 shows a first illustrative embodiment of a filter in accordance with these principles. In this embodiment, the signal wavepath is a conductively bounded rectangular waveguide 20. Two pair of longitudinally spaced conductive discontinuities 21 and 22 form two capacitive reactances equivalent to the shunt-connected circuit components 10 and 12 of FIG. 1. The region of waveguide 20 between the discontinuities defines a cavity 19.

An E-plane, or series T-junction is made between waveguide 20 and the E-plane branch 23 of a magic-T hybrid junction 24. Advantageously, the series T-junction is made at a maximum current position within cavity 19. In general, the current is a maximum at integral multiples of a wavelength from the cavity ends. Thus, for a 1-wavelength long cavity, the maximum current position is located at the cavity center.

A varactor diode 30 and 31 extends transversely across each of the collinear branches 27 and 28, respectively, of junction 24. Advantageously the diodes are symmetrically located with respect to the junction region, and with respect to the narrow walls of the branches. Each branch is terminated by means of an adjustable shorting piston 32 and 33. A pump signal source 26 is connected to the H-plane branch 25 of junction 24.

Varactor diodes 30 and 31 are connected to direct current bias sources 34 and 35 through RF chokes 36 and 37, respectively. In addition each varactor is connected to an opposite end of an L–C circuit 39. The latter can either be a parallel or, as shown, a series L–C circuit.

In a typical prior art band-pass filter, the bandwidth of the passband is determined by the loaded cavity Q. The purpose of the arrangement of FIG. 2 is to superimpose an external bandwidth restriction upon the cavity by introducing the equivalent of a high-Q series resonant circuit in series between discontinuities 21 and 22.

The circuit is adjusted such that series L–C circuit 39 projects a low impedance across the open end 8 of junction branch 23 at the band-pass center frequency. Designating the latter as $F_o$, and the pump signal source frequency as $f_p$, circuit 39 is tuned to resonance at a frequency $f_o=F_o-f_p$, where $f_p$, $F_o$, and the length L of junction branch 23 are adjusted to produce the desired image of circuit 39 in series with cavity 19. The shorting pistons are also adjusted for optimum coupling between the varactors and the several signals.

In operation, an input signal, including signal components extending over a band of frequencies between $F_1$ and $F_n$, are coupled to cavity 19. These excite currents in branch 23 of junction 24 which are coupled, 180° out of phase, to varactor diodes 30 and 31 along with the pump signal. Difference frequency signals, produced by the varactors, are in turn coupled out of phase to opposite ends of circuit 39.

Signal components at the difference frequency $f_o$, to which L–C circuit 39 is tuned, see a low impedance which, because of the previously described adjustment of branch 23, is reflected across the input end 8 of branch 23 as a low series impedance at signal frequency $F_o$. At frequencies above and below $f_o$, the impedance across circuit 39 increases at a rate dictated by the circuit Q. This variation in impedance is also reflected across the input end of branch 23 thereby introducing an increasing series impedance in cavity 19. The effect is to impose the bandwidth characteristic of circuit 39 upon the cavity 19. Designating the half-power bandwidth of circuit 30 as $2\Delta f$, the filter band-pass $2\Delta F$ is given as $$2\Delta F=2\Delta f=f_o/Q_{39},$$

where $Q_{39}$ is the Q of circuit 39.

Assuming, for purposes of illustration, a signal frequency $F_o$ equal to $100\times10^9$ hertz, a resonant frequency $f_o$ of $1\times10^9$ hertz and a $Q_{39}$ of 50, the effective Q imaged at the cavity is, from equation (4), 5000.

While a loaded Q of 5000, yielding low losses, is not remarkable in the microwave frequency range, it is to be recognized, nevertheless, that this value is substantial, and is generally suggestive of cavities having a volume of several cubic wavelengths. By contrast, the actual physical resonator can be much smaller, and the desired bandwidth realized by means of a lumped-element resonant circuit of modest Q.

Figure 3:
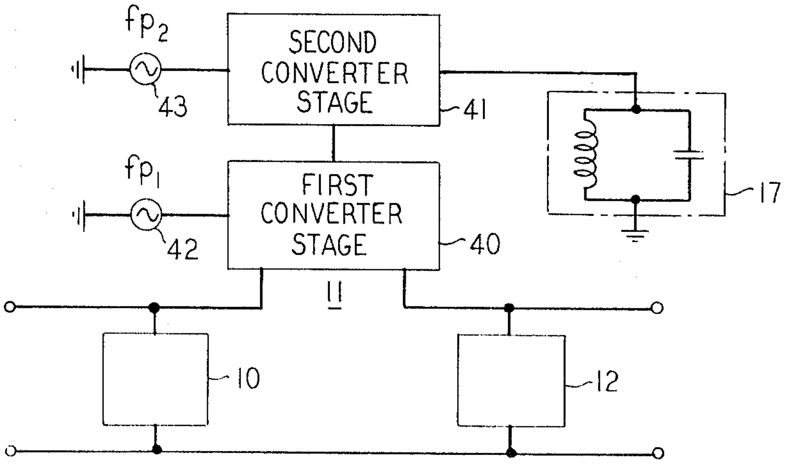
FIG. 3 shows, in block diagram, a filter employing two stages of frequency conversion.

Increased effective Q's can be obtained by increasing the frequency conversion ratio. However, since it is desirable that the difference between the signal and the oscillator frequencies not be too small, the down conversion in such cases is advantageously accomplished in stages, as illustrated in FIG. 3. In this arrangement circuit 11 comprises a two-stage frequency converter wherein the output from the first converter stage 40 is coupled to a second converter stage 41. In this manner, the difference between the frequencies $f_{p1}$ and $f_{p2}$ of the two pump signal sources 42 and 43, and the signals applied to the respective converters can be maintained large enough to insure stable operation.

Figure 4:
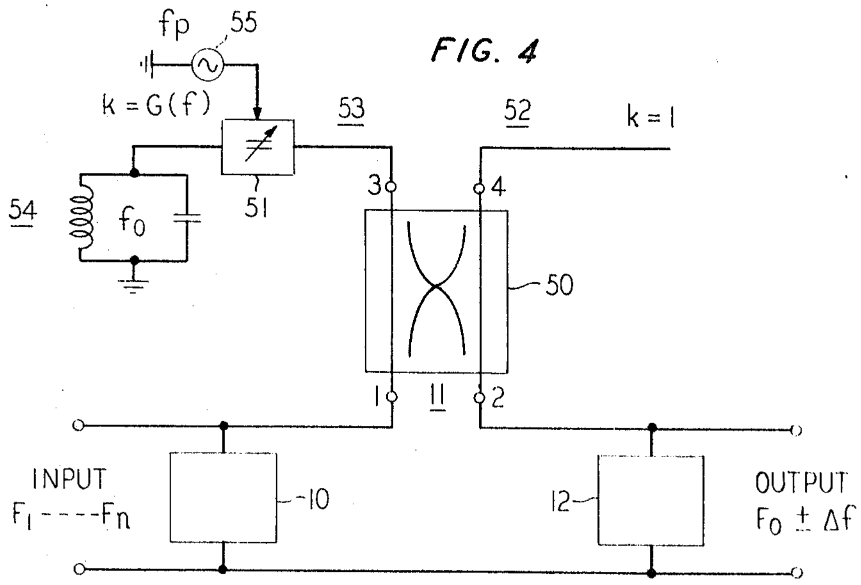
FIG. 4 shows a second illustrative embodiment of the invention.

FIG. 4 in an alternative embodiment of a filter comprising, as in FIG. 1, a plurality of cascaded shunt-connected and series-connected circuit components 10, 11 and 12, wherein one or more selected circuit components 11 includes an L–C circuit 54 coupled to the filter through a frequency converter 51. In this particular embodiment, coupling between converter 51 and the high frequency circuit is through a 3-db. quadrature hybrid coupler 50. The latter is a four-port power divider in which the ports are arranged in pairs 1–2 and 3–4, with the ports comprising each pair being conjugate to each other but in coupling relationship with the ports of the other of said pairs. In each of the many well-known couplers of this type, there is a 90° relative phase difference between the two output signal components. Hence, the designation "quadrature" coupler. In addition, the hybrids of interest divide the incident power into two equal components, hence, the 3 db. designation.

More specifically, in the embodiment of FIG. 4, circuit component 11 is connected in series with the high frequency circuit through ports 1 and 2 of coupler 50. Branch circuit 52, coupled to port 4, is left open-circuited. Branch circuit 53, connected to port 3, includes frequency converter 51 and the parallel L–C circuit 54 connected to the low frequency end of the converter. The latter can be a varactor diode or any other well-known type of frequency mixer. A pump source 55, tuned to a frequency $f_p$ different than the signal frequencies, is also coupled to the converter.

In operation, high frequency wave energy coupled to port 1 of hybrid coupler 50 divides equally between ports 3 and 4. The signal component at port 4 sees an open circuit at the end of branch 52 and is reflected back towards hybrid 50 with a coefficient of reflection $k=1$. The signal component at port 3 is down-converted by the action of converter 51 and sees a parallel L–C circuit whose coefficient of reflection varies as a function of frequencies. At frequencies far from $f_o$, the L–C circuit is essentially a short circuit, having a coefficient of reflection $k=-1$. Thus, signal components far from resonance are reflected with a 180° phase reversal. As a result, the reflected signals received back in ports 3 and 4 recombine in port 1 and are not transmitted along the filter. (Though not shown, a phase shifter may be required to equalize the phase shift in the branch circuits connected to ports 3 and 4.) For the signal component whose frequency is equal to the resonant frequency $f_o$, L–C circuit 54 appears as an open circuit with a coefficient of reflection $k=1$. At this frequency the reflected signal components received at ports 3 and 4 recombine in port 2 and are totally transmitted along the filter. At frequencies near $f_o$, the signals are partially transmitted and partially reflected. Thus, the filter passband is determined by the bandwidth (or Q) of the low frequency L–C circuit 54.

In an alternative to the embodiment of FIG. 4, port 4 is short circuited and a series L–C circuit is used as the frequency converter low frequency load.

It is an advantage of the embodiment of FIG. 4 that the coupler can be a lumped-element coupler of the type described by H. R. Beurrier in his copending application Ser. No. 709,091, filed Feb. 28, 1968 and assigned to applicant's assignee. Using such a coupler and the techniques of the present invention, very narrow band strip transmission line filters can be realized.

Figure 5:
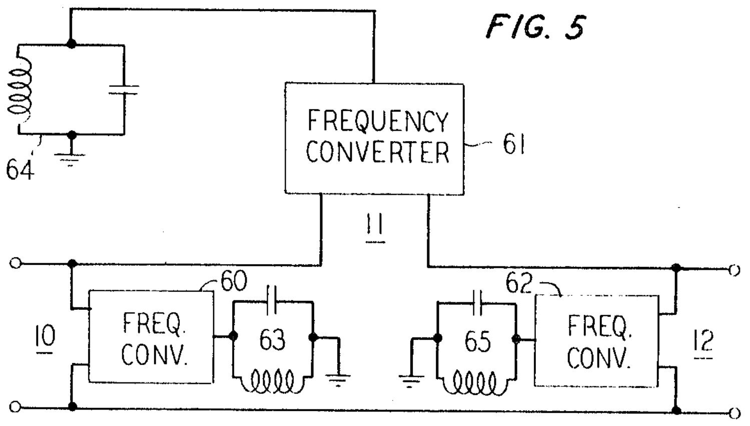
FIG. 5 shows, in block diagram, a filter wherein both shunt and series circuit components are imaged.
Figure 6:
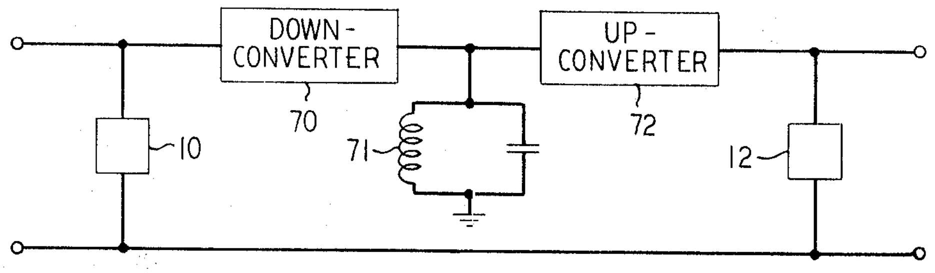
FIG. 6 shows, in block diagram, a filter wherein frequency converters are employed in a transmissive mode to image an impedance.

All of the illustrative embodiments described hereinabove have been characterized as filters; have included series and shunt-connected circuit elements; and have used a frequency converter in a reflective mode to image a series-connected circuit component. It will be understood, however, that these details are merely illustrative and are not intended as limitations upon the scope of the invention. For example, the shunt-connected components in a filter circuit can also be imaged through a frequency converter. This is illustrated in FIG. 5 wherein both the shunt-connected circuit components 10 and 12 and the series-connected circuit component 11 are the high frequency images of low frequency L–C circuits 63, 64 and 65. In this embodiment, as in the embodiments of FIGS. 1 through 4, the frequency converters 60, 61 and 62 operate in the reflective mode in which the high frequency signal is down-converted, reacts with the low frequency L–C circuit, and is then up-converted by the same frequency converter. In an alternative transmissive mode, two frequency converters are used as illustrated in FIG. 6. In this embodiment series-connected component 11 comprises a frequency down-converter 70, a low frequency L–C circuit 71, and an up-converter 72. Thus, in this circuit a different frequency converter is used to down-convert and to up-convert in contrast to the usage shown in FIG. 5 wherein each converter both down-converts the incident signal and then up-converts the reflected signal.

It will also be recognized that filtering action can also be obtained using only a shunt or only a series frequency-selective circuit instead of a cascade of series and shunt-connected circuit elements as illustrated in the various FIGS. The use of a combination of passive shunt and/or series circuit components in conjunction with the imaged components, however, is desirable in that the out-of-band rejection is passively enhanced, thus reducing the amplitude of the incident signal reaching the converter and, thereby, minimizing the possibility of intermodulation within the converter.

Figure 7:
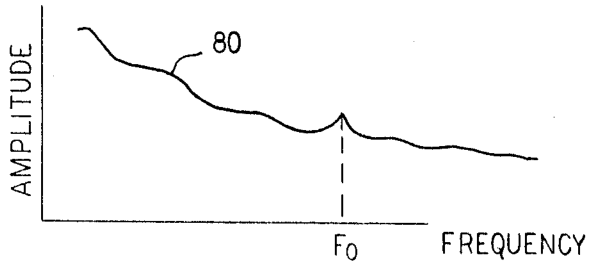
FIGS 7 and 8, included for purposes of explanation, show a circuit response that is to be equalized employing the techniques of the present invention.
Figure 8:
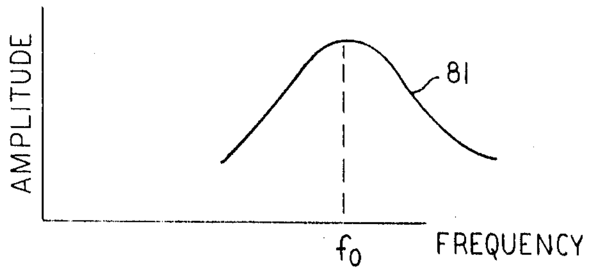

The principles of the present invention can also be employed in an equalizer circuit where the frequency characteristic to be compensated (or to be duplicated) includes a high frequency discontinuity. One example of this is shown in FIG. 7, where the frequency characteristic 80 includes a bump at a high frequency $F_o$. Clearly, duplicating such a characteristic at frequency $F_o$ would be very difficult. At a lower frequency, $f_o$, however, the characteristic has a much more gentle and, hence, more reasonable characteristic, as illustrated by curve 81 in FIG. 8. Accordingly, the use of a frequency converter to image the low frequency characteristic of FIG. 8 at the higher frequency $F_o$ provides a realistic way of generating the required high frequency characteristic.

Figure 9:
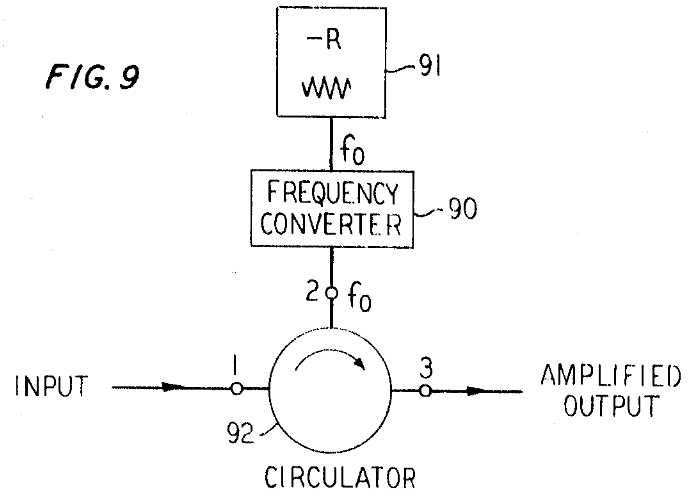
FIG. 9 shows, in block diagram, the use of a frequency converter to image a negative resistance.

A final use of the imaging technique is illustrated in FIG. 9. In this arrangement a frequency converter 90 is used to image a negative resistance 91 at a higher frequency. As is well known, tunnel diodes are not generally operative above the order of $20\times10^9$ hertz. By using a converter, however, the operative range can be extended by imaging the negative resistance of the diode at a frequency well above its normal operating range. In the embodiment of FIG. 9, the converter is connected to port 2 of a three-port circulator 92. The input signal is coupled to port 1 and the amplified signal extracted at port 3.

In all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

I claim:

1. In combination:

an electromagnetic wave transmission system operative over a first band of frequencies between $F_1$ and $F_n$;

means for energizing said system over said frequency band coupled to the input end of said system;

means for utilizing signals within at least a portion of said band coupled to the input end of said system;

nonregenerative frequency converting means coupled along said system, between said input and output ends, for simultaneously down-converting signals within said first band to a second, lower band of frequencies and up-converting said lower band of frequencies back to said first band of frequencies;

a low frequency circuit coupled to the lower frequency side of said frequency converting means; and characterized in that said frequency converting means images the impedance of said low frequency circuit into said transmission system.

2. The combination according to claim 1 wherein said system is a filter.

3. The combination according to claim 1 wherein said system is an equalizer.

4. The combination according to claim 1 wherein said low frequency circuit is an L–C circuit tuned to a frequency $f_o$ within said second, lower band of frequencies.

5. The combination according to claim 1 wherein said system is an amplifier, and said low frequency circuit is a negative resistance.

6. The combination according to claim 1 wherein said system includes a plurality of cascaded series and shunt-connected circuit components; and wherein selected ones of said components comprise said frequency converting means and said low frequency circuit.

7. The combination according to claim 1 wherein said system includes a conductively bounded cavity tuned to resonate at a frequency $F_o$ within said first band of frequencies;

wherein said frequency converting means is coupled to said cavity by means of a magic-T hybrid junction; and wherein said low frequency circuit images at said cavity a narrow band resonance centered at said frequency $F_o$.

8. The combination according to claim 7 wherein the E-plane branch of said hybrid makes an E-plane junction with said cavity in a region of maximum cavity current;

wherein said frequency converting means comprise a pair of varactor diodes, one of which is located in each of the two collinear hybrid branches; and wherein a pumping signal source is coupled to the H-plane hybrid branch.

9. The combination according to claim 1 wherein said frequency converting means includes a 3-db. quadrature hybrid junction having two pair of conjugate ports;

wherein one pair of conjugate ports are coupled to said system;

wherein one of the other pair of conjugate ports is open-circuited;

wherein the fourth port is coupled to a frequency converter; and wherein said low frequency circuit is a parallel L–C circuit.